(12) United States Patent
Creamer

(10) Patent No.: US 12,462,301 B2
(45) Date of Patent: *Nov. 4, 2025

(54) ELECTRONIC TRADING USING MARKET DATA CHANNELS

(71) Applicant: Geneva Technologies, LLC, Chicago, IL (US)

(72) Inventor: Robert S. Creamer, Chicago, IL (US)

(73) Assignee: Geneva Technologies, LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/748,976

(22) Filed: Jun. 20, 2024

(65) Prior Publication Data

US 2024/0338766 A1    Oct. 10, 2024

Related U.S. Application Data

(63) Continuation of application No. 17/353,734, filed on Jun. 21, 2021, now Pat. No. 12,039,599, which is a continuation of application No. 16/544,843, filed on Aug. 19, 2019, now Pat. No. 11,042,937, which is a continuation of application No. 14/576,059, filed on Dec. 18, 2014, now Pat. No. 10,387,953.

(51) Int. Cl.
*G06Q 40/04* (2012.01)

(52) U.S. Cl.
CPC .................... *G06Q 40/04* (2013.01)

(58) Field of Classification Search
None
See application file for complete search history.

(56) References Cited

U.S. PATENT DOCUMENTS

| | | |
|---|---|---|
| 10,387,953 B2 | 8/2019 | Creamer |
| 11,042,937 B2 | 6/2021 | Creamer |
| 2007/0038549 A1* | 2/2007 | Janowski ............... G06Q 40/04 705/37 |
| 2013/0226764 A1* | 8/2013 | Battyani ............... G06Q 40/04 705/37 |
| 2016/0125533 A1 | 5/2016 | Davis |
| 2022/0084113 A1 | 3/2022 | Creamer |

* cited by examiner

*Primary Examiner* — Matthew S Gart
*Assistant Examiner* — Liz P Nguyen
(74) *Attorney, Agent, or Firm* — Perkins Coie LLP

(57) ABSTRACT

Systems and methods related to financial trading are provided. More specifically, some embodiments relate to systems and methods for electronic trading using market data channels which users can subscribe. Various embodiments of the present technology can provide a suite of devices that are designed to actively modify market data at the intake point (co-location facility) in order to optimally disseminate only relevant information to various applications. These filtered market data channels can then be accessed by trading systems through various subscription models. Various embodiments allow for any type of channel that alters the natural or pure market data feed to produce different data flows and other signals (e.g., triggers, synthetic prices, etc.)

20 Claims, 7 Drawing Sheets

ELECTRONIC TRADING USING MARKET DATA CHANNELS

CROSS-REFERENCES TO RELATED APPLICATIONS

This application is a continuation of U.S. patent application Ser. No. 17/353,734, filed Jun. 21, 2021, which is a continuation of U.S. patent application Ser. No. 16/544,843, now U.S. Pat. No. 11,042,937, filed Aug. 19, 2019, which is a continuation of U.S. patent application Ser. No. 14/576,059, filed on Dec. 18, 2014, now U.S. Pat. No. 10,387,953 and entitled "ELECTRONIC TRADING USING MARKET DATA CHANNELS," the disclosures of which are hereby incorporated herein in their entirety by reference for all purposes.

TECHNICAL FIELD

Various embodiments of the present technology generally relate to financial trading. More specifically, some embodiments relate to systems and methods for electronic trading using market data channels.

BACKGROUND

A financial market allows traders and entities to buy and sell (i.e., trade) financial securities (e.g., stocks and bonds), commodities (e.g., precious metals or agricultural goods), futures contracts, and other investment products. Financial markets work by placing interested buyers and sellers in one "place" (e.g., an actual or electronic marketplace), thus making it easier for market participants to find each other. A trader is a market participant who buys and sells financial instruments such as stocks, bonds, commodities, options, currencies, and derivatives.

Traders generally follow different timelines for transacting within a financial marketplace. Position/trend traders may stay in positions for over a few weeks, sometimes up to a year. Swing traders may hold positions for a few days to a few weeks. Day traders may hold positions throughout a trading day (for periods that are sometimes as short as a few seconds or as long as a few hours) and finish the day with no open positions. This form of trading requires the trader to be present in front of the computer when trading is occurring and to quickly review potentially profitable transactions based on the market data.

In addition to manual trading, electronic trading uses electronic platforms to automatically enter trading orders generated by computer algorithms. The computer algorithms may generate orders based on a variety of market data, rules, and variables. Examples of the market data include price and quantity of orders in the market.

BRIEF DESCRIPTION OF THE DRAWINGS

Embodiments of the present invention will be described and explained through the use of the accompanying drawings in which.

Figure 1:
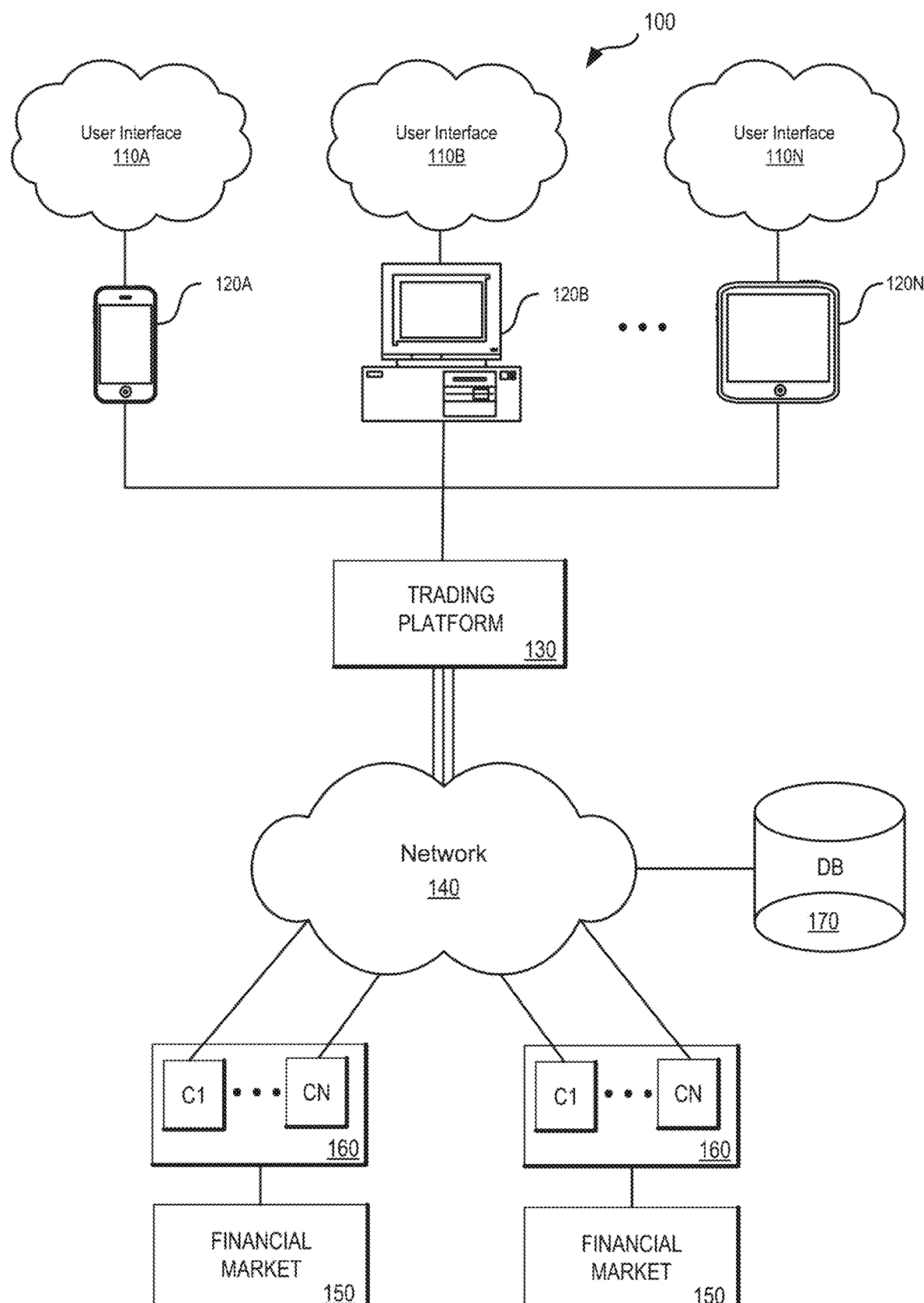
FIG. 1 illustrates an example of a network-based environment in which some embodiments of the present invention may be utilized.

The drawings have not necessarily been drawn to scale. For example, the dimensions of some of the elements in the figures may be expanded or reduced to help improve the understanding of the embodiments of the present invention. Similarly, some components and/or operations may be separated into different blocks or combined into a single block for the purposes of discussion of some of the embodiments of the present invention. Moreover, while the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Various embodiments of the present technology generally relate to financial trading. More specifically, some embodiments relate to systems and methods for electronic trading using market data channels to which users can subscribe. Exchange market data can include many components, but primarily consist of the bids and offers for contracts, notification that a trade has occurred, and streaming updates on changes in the order book. Market data may be "top of book" only, which is restricted to the best bid and best offer and last traded quantity/price. Market data may also consist of the entire order book (all bids and offers at all prices) for a given contract, regardless of how close a given bid or offer is to the inside market.

Traditionally, market data has been disseminated from exchanges and other marketplaces electronically without any filter other than the ability of the exchange to turn off a specific contract's price feed altogether (either by choice of the user or due to subscription level agreements with the user). While some trading software providers provide for a filtering of prices outside a certain range (i.e., only display the best five bid prices and best five offer prices), there is currently no system that provides custom filters across a wide range of variables.

In contrast, various embodiments of the present technology provide a suite of devices and mechanisms (e.g., Field Programmable Gate Arrays ("FPGAs"), hardware/software combinations, application specific integrated circuits ("ASICs") or similar technologies) that are designed to actively modify market data at the intake point (co-location facility) in order to optimally disseminate only relevant information to various applications. These filtered market data channels can then be accessed by trading systems through various subscription models. Various embodiments allow for any type of channel that alters the natural or pure market data feed to produce different data flows and other signals (e.g., triggers, synthetic prices, etc.). In some embodiments, order generation could occur on the FPGA chip, or on an adjacent FPGA chip, without having to involve a separate trading platform or device.

Some of the advantages and technical effects of the present technology include more efficient analytic computations and calculations for electronic trading. Traditionally, analytics and calculations are managed at the application level. By making common calculations and refinements "on the wire," redundant calculations can be minimized and applications can work more efficiently at trade execution. Additionally, stripping "noise" or otherwise useless or unwanted data at the inception point allows for smaller bandwidth between communication points. For example, market data received at one exchange's co-location site might be sent to a server at another exchange's co-location site, where the firm's execution application resides. In addition, under existing architectures, the full market data stream from the first exchange would be sent to the second exchange's co-location site, requiring significant bandwidth. By sending tailored streams of data this bandwidth need is greatly reduced creating a variety of advantages. Given the move by major players in the industry to microwave transmission between sites (which can be extremely expensive from a bandwidth standpoint) this bandwidth reduction could greatly increase the number of strategies that are economically and technically feasible. Other advantages and technological effects can be easily appreciated by those of ordinary skill in the art.

In the following description, for the purposes of explanation, numerous specific details are set forth in order to provide a thorough understanding of embodiments of the present invention. It will be apparent, however, to one skilled in the art that embodiments of the present invention may be practiced without some of these specific details.

Moreover, the techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. The machine-readable medium may include, but is not limited to, floppy diskettes, optical discs, compact disc read-only memories (CD-ROMs), magneto-optical discs, ROMs, random access memories (RAMs), erasable programmable read-only memories (EPROMs), electrically erasable programmable read-only memories (EEPROMs), application-specific integrated circuits (ASICs), magnetic or optical cards, flash memory, or other type of media/machine-readable medium suitable for storing electronic instructions.

The following applications provide various examples and details of trading interfaces and systems are hereby incorporated by reference in their entirety for all purposes: U.S. patent application Ser. No. 13/463,753 entitled "METHODS AND SYSTEMS FOR SHOWING PERSPECTIVE IN MARKET DATA" filed on May 3, 2012, U.S. patent application Ser. No. 13/837,945 entitled "METHODS AND SYSTEM FOR SHOWING PERSPECTIVE IN MARKET DATA" filed on Mar. 15, 2013, and U.S. Patent Application No. 61/909,969 entitled "PROVIDING GUARANTEED EXECUTION OF MARKET SPREADS" filed on Nov. 27, 2013.

Terminology

Brief definitions of terms, abbreviations, and phrases used throughout this application are given below.

The phrases "in some embodiments," "according to some embodiments," "in the embodiments shown," "in other embodiments," and the like generally mean the particular feature, structure, or characteristic following the phrase is included in at least one implementation of the present invention, and may be included in more than one implementation. In addition, such phrases do not necessarily refer to the same embodiments or different embodiments.

The term "module" or "engine" refers broadly to general or specific-purpose hardware, software, or firmware (or any combination thereof) components. Modules and engines are typically functional components that can generate useful data or other output using specified input(s). A module or engine may or may not be self-contained. Depending upon implementation-specific or other considerations, the modules or engines may be centralized or functionally distributed. An application program (also called an "application") may include one or more modules and/or engines, or a module and/or engine can include one or more application programs.

General Description

FIG. 1 illustrates an example of a network-based environment in which some embodiments of the present invention may be utilized. The embodiments illustrated in FIG. 1 show user interfaces 110A-110N running on computing devices 120A-120N. Computing devices 120A-120N can be any computing device capable of receiving user input as well as transmitting and/or receiving data via trading platform 130. Trading platform 130 can connect via network 140 to financial market 150 through data channels 160 and also to database 170. While only one trading platform 130, one network 140, two electronic marketplaces 150, and one inventory database 170 are illustrated in FIG. 1, other embodiments may include additional and/or fewer trading platforms 130, networks 140, electronic marketplaces 150, and/or inventory databases 170.

In one embodiment, computing devices 120A-120N may be a conventional computer system (e.g., a desktop or laptop computer), a tablet computer, or a mobile device having computer functionality (e.g., a mobile telephone or a smartphone). Computing devices 120A-120N may be configured to communicate with trading platform 130. In some embodiments, computing devices 120A-120N can retrieve or submit information to trading platform 130 and run one or more applications for interacting with a user. For example, computing devices 120A-120N can execute a browser application or a customized client to enable interaction between the computing devices 120A-120N and trading platform 130.

Trading platform 130 may include one or more servers capable of allowing traders to submit and manage orders (natural or synthetic) with an exchange or electronic marketplace 150. For example, trading platform may allow a trader to submit orders for stocks, options, future contracts, commodity contracts, etc. Trading platform 130 can be used to generate, manage, execute, distribute, and/or record trading and/or account data received from various sources (e.g., third-party data providers, financial institutions, etc.)

through various interfaces. In some embodiments, trading platform 130 can include various data processing and analytic tools allowing users of the trading platform to make better trading decisions. In some embodiments, computing devices 120A-120N can be used to setup various automated or partially automated trading algorithms.

Trading platform 130 may be a third-party service accessed by various financial institutions or individuals. In some cases, a trading firm, individual or unaffiliated users, exchange members, and/or other groups may sign up for the service and submit and manage orders. In other embodiments, trading platform 130 may be a private or restricted platform that is owned and operated by an individual financial institution and only allows access to members of a trading firm or group. Trading platform 130 may charge a fee for service or provide various membership levels offering different analysis features.

Network 140 can include any combination of local area and/or wide area networks using both wired and wireless communication systems. In one embodiment, network 140 uses standard communications technologies and/or protocols. Thus, network 140 may include links using technologies such as Ethernet, 802.11, worldwide interoperability for microwave access (WiMAX), 3G, 4G, CDMA, digital subscriber line (DSL), etc. Similarly, the networking protocols used on network 140 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over network 140 may be represented using technologies and/or formats including hypertext markup language (HTML) or extensible markup language (XML). In addition, all or some links can be encrypted using conventional encryption technologies such as secure sockets layer (SSL), transport layer security (TLS), and Internet Protocol security (IPsec).

As illustrated in FIG. 1, trading platform 130 can access market data from various channel devices 160. Channel devices 160 may be stand-alone devices or integrated with other devices (e.g., with a router or switch). Each channel generated by channel devices 160 can customize the information before broadcasting to subscribers. For example, channel devices 160 could generate a channel that modifies the native market data so that all one lot orders are removed from a given market data stream so that traders, autospreaders, or other trading systems within a firm do not react to insignificant data. As another example, these devices could generate a channel that modifies the native market data so that all orders that have not been in the book for a certain minimum/maximum/specific resting time are removed, displayed, or included in the channel. Another channel generated by these devices could modify the native market data so that orders are removed that originate from within the firm. This channel provides the additional benefit of defusing the intent component of self-match/wash trade violations, which typically require knowledge of others' orders or intent. Other examples include, but are not limited to, channels that provide synthetic calculations, filtering by counterparties, or other user-defined/system-defined characteristics.

As another example, channel devices 160 could generate a channel that modifies the native market data so that only orders originating within the firm are displayed. This can provide risk management benefits in the ability to view the firm's impact on the market at an enterprise level, plus the ability to internalize or match orders off-exchange in order to minimize exchange costs. Another channel may only stream firm-wide fill information. Channel devices 160 could also generate a channel that modifies the native market data so that market data from fragmented markets is consolidated (different equity markets trading the same stocks, for example). As another example, a market data feed of indicators, synthetic prices, or triggers is presented that can be listened to by applications or viewed by users (implied prices that use proprietary models, for example) may be available on another channel.

Some embodiments of the technology enable multiple rule sets across different contracts and spreads, and then offer these refined streams as channels that a user can request to enhance their trading. For example, an e-mini S&P future contract native stream could be refined into ten different channels with ten different characteristics (filters, weightings, etc.). Similar filters or channels could be applied to the gold future contract. A user could then determine that S&P channel three and gold channel seven provide the optimum inputs for his or her trading style or algorithm. Still yet, some embodiments allow for channels devices 160 to filter, process, or synthesize information from multiple financial markets 150.

Inventory database 170 can store a variety of information that can be utilized by trading platform 130 and/or electronic marketplaces 150 (e.g., stock market, bond market, capital market, foreign exchange market, futures market, etc.). For example, database 170 may have stored thereon trading and/or account data and information about each user such as, but not limited to, age, contact information, e-mail address, membership level, activity logs, trading logs, and other information. In addition, order information such as, but is not limited to, time received, time executed, identification of a financial product, order identifier, order type, quantity, financial market, restrictions, owner, routing information, current status, and the like may also be stored in database 170.

Figure 2:
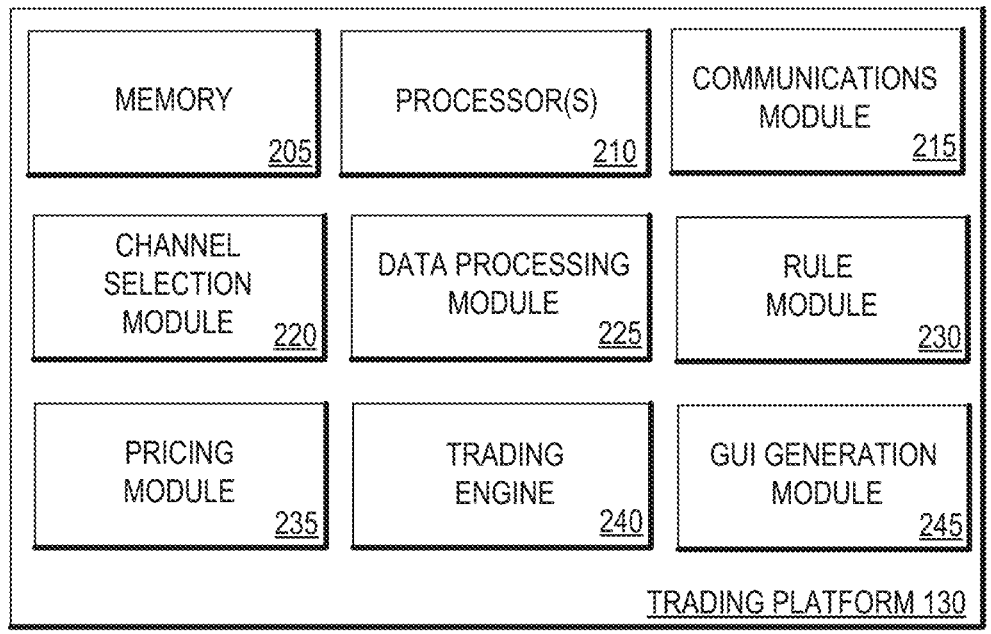
FIG. 2 illustrates various components and interactions in a trading platform according to one or more embodiments of the present invention.

FIG. 2 illustrates various components and interactions in a trading platform 130 according to one or more embodiments of the present invention. According to the embodiments shown in FIG. 2, trading platform 130 can include memory 205, one or more processors 210, communications module 215, channel selection module 220, data processing module 225, rule module 230, pricing module 235, trading engine 240, and graphical user interface (GUI) generation module 245. Other embodiments of the present invention may include some, all, or none of these modules and components along with other modules, applications, and/or components. Still yet, some embodiments may incorporate two or more of these modules and components into a single module and/or associate a portion of the functionality of one or more of these modules with a different module. For example, in one embodiment, communications module 215 and channel selection module 220 may be combined into a single module for receiving, selecting, and processing data from the various channels.

Memory 205 can be any device, mechanism, or populated data structure used for storing information. In accordance with some embodiments of the present invention, memory 205 can encompass any type of, but is not limited to, volatile memory, nonvolatile memory and dynamic memory. For example, memory 205 can be random access memory, memory storage devices, optical memory devices, media magnetic media, floppy disks, magnetic tapes, hard drives, SDRAM, RDRAM, DDR RAM, erasable programmable read-only memories (EPROMs), electrically erasable programmable read-only memories (EEPROMs), compact disks, DVDs, and/or the like. In accordance with some embodiments, memory 205 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as memory 205.

Memory 205 may be used to store instructions for running one or more applications or modules on processor(s) 210. For example, memory 205 could be used in one or more embodiments to house all or some of the instructions needed to execute the functionality of communications module 215, channel selection module 220, data processing module 225, rule module 230, pricing module 235, trading engine 240, and/or GUI generation module 245.

Communications module 215, in accordance with one or more embodiments of the present invention, manages and translates any requests from a user (e.g., received through a graphical interface screen), application, trading platform, financial market, channel device, or tool into a format required by the destination component, platform, tool, and/or system. Similarly, communications module 215 may be used for communications between modules, databases, and/or systems that use different communication protocols, data formats, and/or messaging routines. In some cases, communications module 215 can be used to monitor and decode various channels and raw market data feeds. Communications module 215 may also be responsible for handling any access challenges needed to access the various channels being broadcast from the channel devices.

Channel selection module 220 can be communicably coupled to communications module 215 and used to select which channel communications module 215 should access. In some embodiments, channel selection module 220 can determine which channels should be accessed based on various trading requirements or specific channel access requests set by a user or trading algorithm. For example, a user could input their desired trading requirements (e.g., into channel selection module 220) and then receive an indication of which channel(s) best match the user's parameters. In addition, channel selection module could also provide instruction sets for creating the desired channel data by additional filtering on the application level (e.g., at the trading application). Similarly, channel selection module 220 may publish a set of fixed channels to users and the user can select (e.g., through a graphical user interface) which channels they would like to see and use. In some embodiments, channel selection module 220 can be used by the user to create a new channel.

Various examples of trading requirements include, but are not limited to, that all one lot orders are removed from a given market data stream, that all orders that have not been in the order book for a certain minimum/maximum/specific resting time are removed, that all orders are removed that originate from within the firm, that only orders originating within the firm are displayed, or the need for various indicators, synthetic prices, or triggers. In some embodiments, when there is no channel that meets the needed requirements, channel selection module may be used to send the requirements to a channel coordinator that can setup a customized channel.

Data processing module 225 can provide additional processing of the market data, triggers, synthetic prices, or other signals retrieved from the channels. Rule module 230 manages multiple rule sets across different contracts and spreads, and then offers these refined streams as channels that a user can request to enhance their trading. These rules can be used by pricing module 235 to create synthetic prices which can be used to create orders that can be submitted by trading engine 240.

GUI generation module 245 can generate one or more GUI screens that allow for interaction with a user of the mobile device. In at least one embodiment, GUI generation module 245 generates a graphical user interface allowing a user of the mobile device to set preferences, create trading algorithms, present reports, and/or otherwise receive or convey information between the user and the trading platform.

Figure 3:
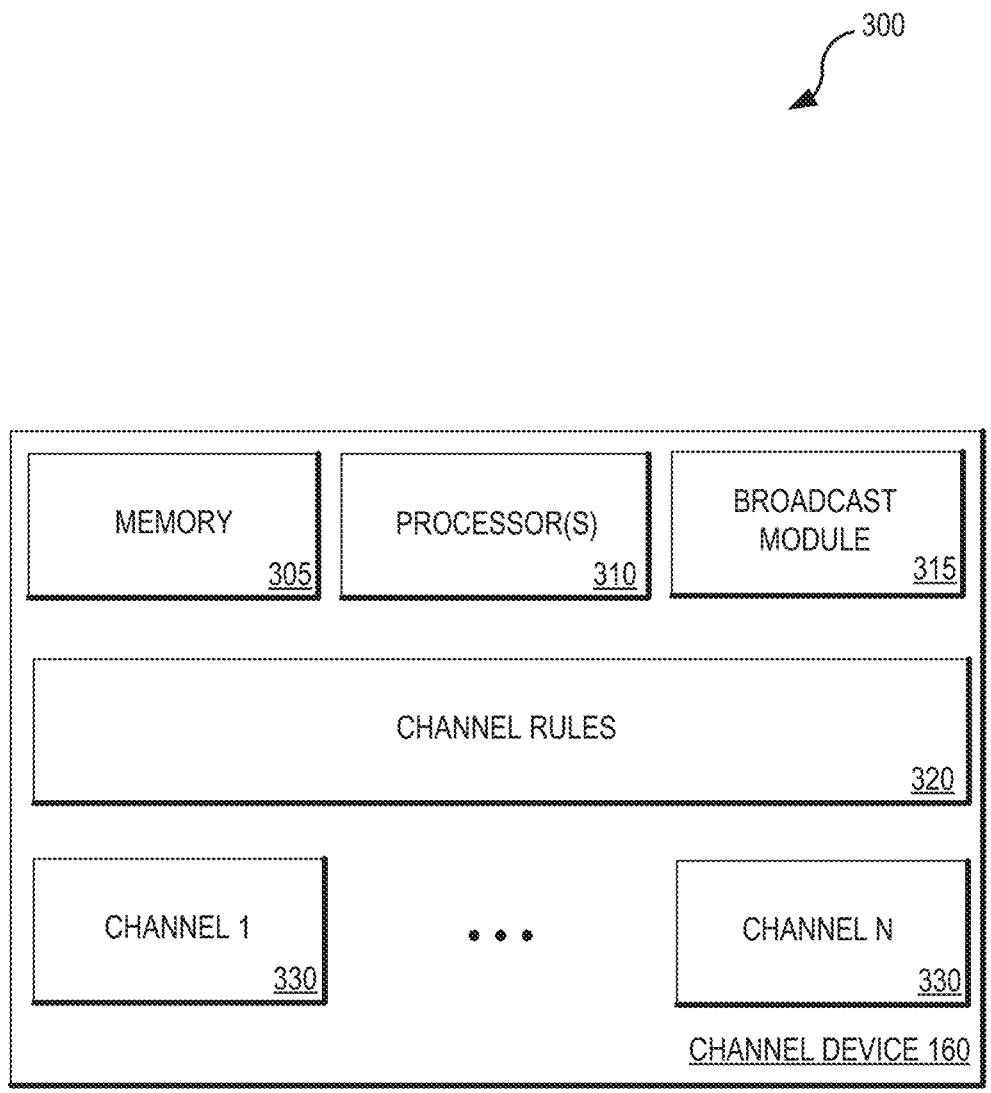
FIG. 3 illustrates various components of a channel device which may be used in accordance with various embodiments of the present invention.

FIG. 3 illustrates various components of a channel device 160 which may be used in accordance with various embodiments of the present invention. According to the embodiments shown in FIG. 3, channel device 160 can include memory 305, one or more processors 310, broadcast module 315, channel rules 320, and one or more channels 330 of customized data feeds. Other embodiments of the present invention may include some, all, or none of these modules and components along with other modules, applications, and/or components. Still yet, some embodiments may incorporate two or more of these modules and components into a single module and/or associate a portion of the functionality of one or more of these modules with a different module. For example, in one embodiment, the functionality of broadcast module 315 and channel rules 320 may be incorporated into a single module.

Memory 305 can be any device, mechanism, or populated data structure used for storing information as described above with reference to memory 205. Memory 305 may be used to store instructions for running one or more applications or modules on processors 310. For example, memory 305 could be used in one or more embodiments to house all or some of the instructions needed to execute the functionality of user broadcast module 315, channel rules 320, and channels 330.

Broadcast module 315 can be any device or mechanism capable of transmitting signals and data from channels 330. For example, broadcast module 315 may include point to point transmission devices such as microwave transmitters, satellite communications transmitters, optical communication devices, or any other type of communication devices. Broadcast module 315 may include various hardware or software encryption modules that are capable of encrypting the signals before they are broadcast over channels 330. In some embodiments, channels 330 may have different bandwidth or latency requirements. Broadcast module 315 can monitor the channels and ensure these and other requirements are met.

Channel rules 320 are the rules used to create the filters, triggers, synthetic prices, and/or other signals produced by the channels. A rule set may create additional filters of certain market data that is not productive to act on. For example, the rules may only display orders on a channel that exceed twenty, or only display orders that have been in the order book for x amount of time, etc. Successful rule sets could be placed on the market data server via FPGA programming, and then distributed throughout the firm. Some channel rules can be used to filter out all other orders by the user firm, conversely, or only display orders submitted by the user's firm. The former rule could assist in preventing trades that could be considered wash trades, a practice prohibited by most exchanges and market regulators. In general, wash trades occur when a trader intentionally executes both a buy and a sell in the same contract at the same price (a "self-match"), and market regulators discourage firms from self matching even among different traders within a firm. For example, if a trader placed a buy order in the book, the order could still be filled by another firm order.

In various embodiments, due to the filter, the traders would have no knowledge that the opposite order existed before they entered it into the order book (i.e., use of this channel defuses any intent or intent inference by the regulators). These types of order filtering channels would also work for electronic strategies, as regulators attempt to use a "known or should have known" standard when looking at self-match activity to create a wash trade violation. For example, by using a channel that only displays firm orders, this channel would allow a firm to show an internal market for orders that, if acted on, would not be sent to an exchange. This internalization activity saves on transaction costs and, since the orders do not cross the exchange, is not a wash trade. Additionally, this data can be a valuable risk management tool by showing the firm's activity in a consolidated manner.

Channel rules 320 can also enable multiple rule sets across different contracts and spreads. The rules then offer these refined streams as 'channels' that a user can request to enhance their trading. For example, an e-mini S&P contract could be refined into 10 different channels with 10 different characteristics, with the same process applied to a gold contract. A user could determine that S&P channel 3 and gold channel 4 provide the optimum inputs for his/her trading style or algorithm responses.

Channels 330 can be any device and/or mechanism (e.g., Field Programmable Gate Arrays ("FPGAs"), hardware/software combinations, or similar technologies) that actively modify market data at the intake point (co-location facility) in order to optimally disseminate only relevant information to various applications. These filtered market data channels can then be accessed by trading systems through various subscription models. Various embodiments allow for any type of channel that alters the natural or pure market data feed to produce different data flows.

Figure 4:
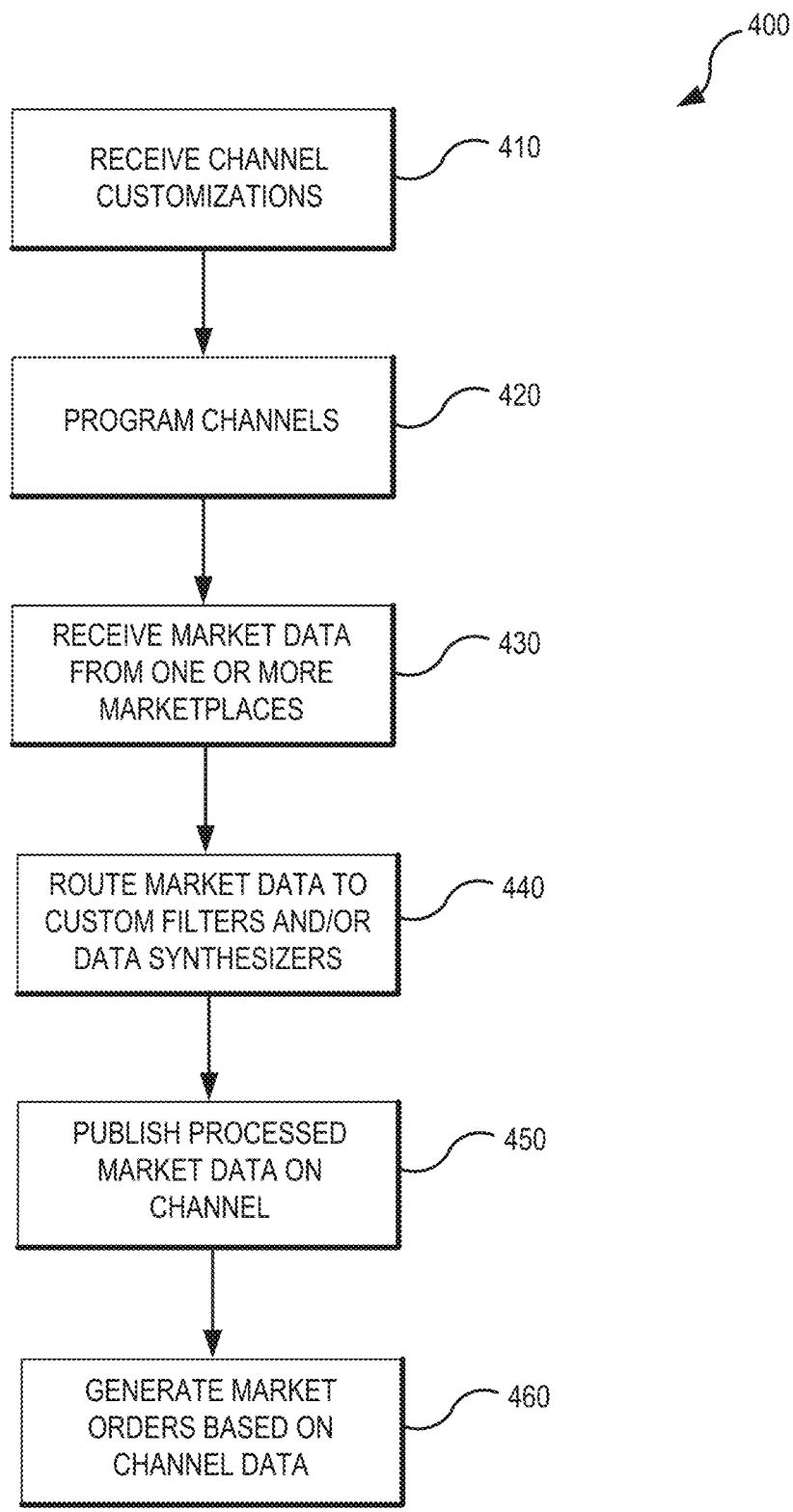
FIG. 4 is a flowchart illustrating a set of operations for generating market orders based on channel data in accordance with one or more embodiments of the present invention.

FIG. 4 is a flowchart illustrating a set of operations 400 for generating market orders based on channel data in accordance with one or more embodiments of the present invention. The operations illustrated in FIG. 4 can be performed by various systems and components such as trading platform 130, electronic marketplace 150, channel devices 160, processor(s) 310, broadcast module 315, channels 330, and/or other devices, systems, components, and/or modules. As illustrated in FIG. 4, receiving operation 410 receives channels customizations or rules. The channel customizations or rules can originate from a firm, a trader (human or algorithm), an administrator, or other authorized individual or system component. Programming operation 420 uses the channel customizations to program one or more channels.

Once programmed, the channel devices can receive market data from one or more marketplaces during data operation 430. In some embodiments, data operation 430 may include a decoding operation that decodes or translates the data into a desired format for processing. Routing operation 440 routes the market data to custom filters and/or data synthesizers where customized data streams and/or other signals are created. The market data and/or other signals are then published on a channel during publishing operation 450. Subscribers to the channel may then generate market orders based, at least in part, on the channel data and/or other signals during generation operation 460.

Figure 5:
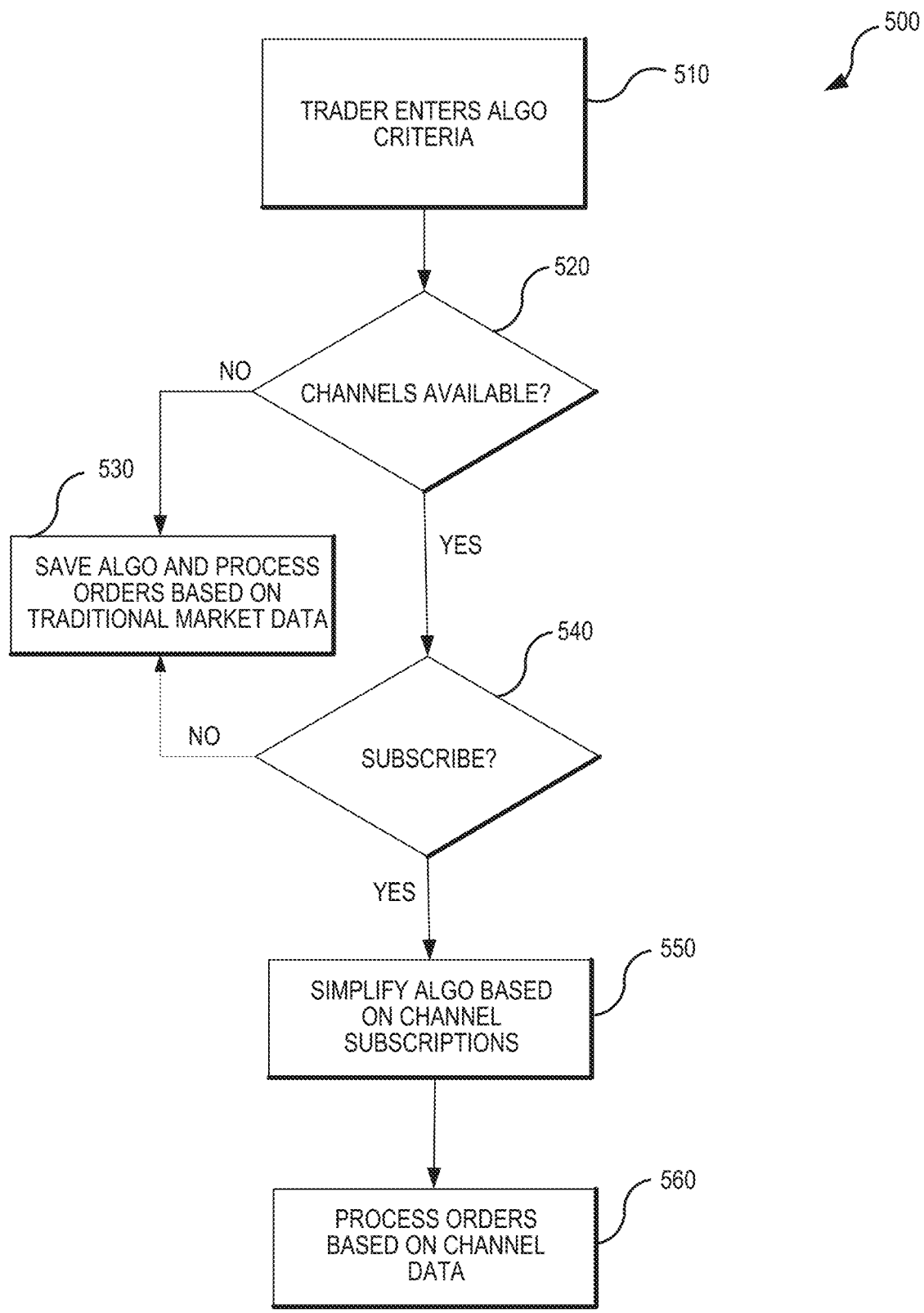
FIG. 5 is a flowchart illustrating a set of operations for processing orders in accordance with various embodiments of the present invention.

FIG. 5 is a flowchart illustrating a set of operations 500 for processing orders in accordance with various embodiments of the present invention. The operations illustrated in FIG. 5 can be performed by various systems and components such as user interface 110A-110N, computing devices 120A-120N, trading platform 130, processor(s) 210, channel selection module 220, data processing module 225, rule module 230, trading engine 240, and/or other devices, systems, components, and/or modules. As illustrated in FIG. 5, a trader can enter electronic trading criteria during setup operation 510.

Availability determination operation 520 determines if channels are available that can reduce the processing load of the algorithm. If availability determination operation 520 determines that no channels are available, the algorithm can be created and saved using creation operation 530. In that case, orders are processed based on traditional market data. If availability determination operation 520 determines that channels are available, then availability determination operation 520 branches to subscription operation 540 where a determination is made as to whether the trader has already subscribed or is willing to subscribe to the channel(s). If subscription operation determines that a subscription is not available or that the trader is unwilling to subscribe, then subscription operation 540 branches to creation operation 530. If subscription operation determines that a subscription is available or that the trader is willing to subscribe, then subscription operation 540 branches to simplification operation 550 where the algorithm is simplified base on the channel subscriptions. Once created, processing operation 560 processes orders based on the channel data.

Figure 6:
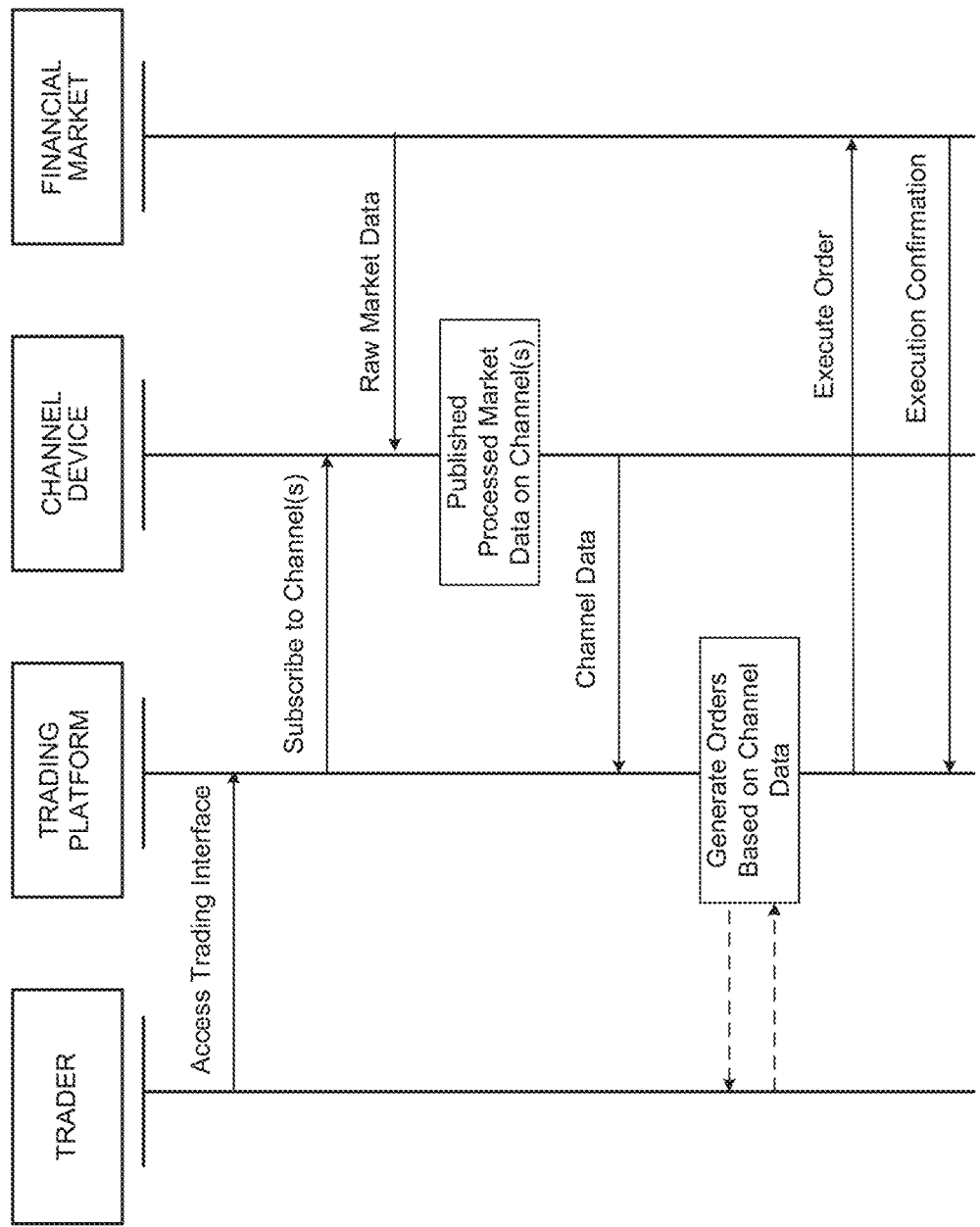
FIG. 6 is a sequence diagram illustrating various communications between components of a system supporting market data channels in accordance with some embodiments of the present invention.

FIG. 6 is a sequence diagram illustrating various communications between components of a system supporting market data channels in accordance with some embodiments of the present invention. A trader (human or electronic) can access the trading platform using a trading interface. The trading platform can allow the trader to subscribe to one or more channels by sending a request to the appropriate channel device or subscription management service. As the raw market data is broadcast, the channel devices can process the data according to the channel rules and publish the channel data to the trading platform. Then, based on the channel data and possibly trader inputs, one or more orders can be generated. These orders are then submitted to the financial market for execution. Once executed, the financial market can submit a confirmation to the trading platform.

Exemplary Computer System Overview

Aspects and implementations of the channel-based trading system of the disclosure have been described in the general context of various steps and operations. A variety of these steps and operations may be performed by hardware components or may be embodied in computer-executable instructions, which may be used to cause a general-purpose or special-purpose processor (e.g., in a computer, server, or other computing device) programmed with the instructions to perform the steps or operations. For example, the steps or operations may be performed by a combination of hardware, software, and/or firmware.

Figure 7:
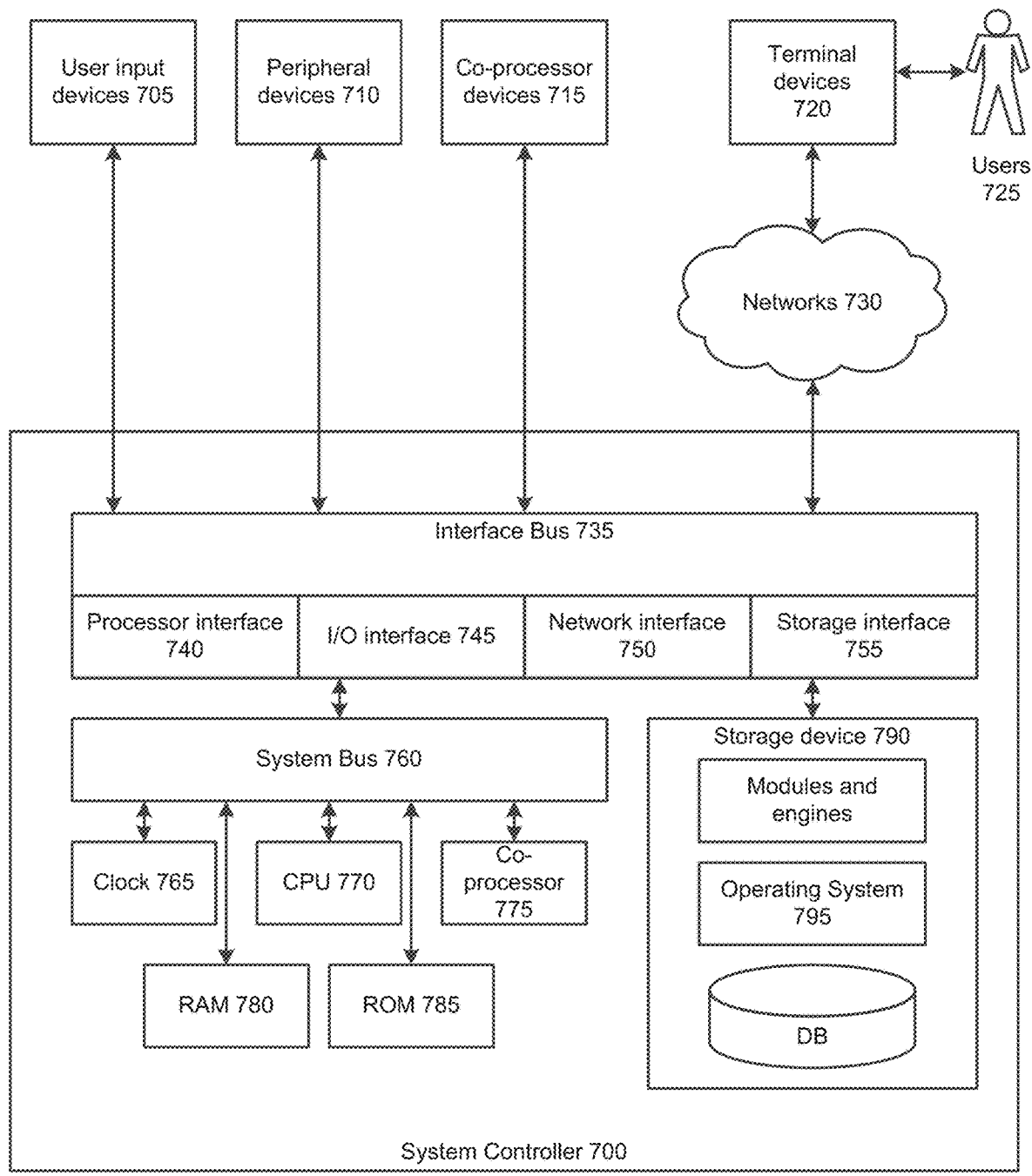
FIG. 7 illustrates an example of a computer system with which some embodiments of the present invention may be utilized.

FIG. 7 is a block diagram illustrating an example machine representing the computer systemization of the channel-based trading system. The channel-based trading controller 700 may be in communication with entities including one or more users 725 (e.g., human and non-human users/traders), client/terminal devices 720 (e.g., devices 120A-120N), user input devices 705, peripheral devices 710, an optional co-processor device(s) (e.g., cryptographic processor devices) 715, and networks 730 (e.g., 140). Users may engage with the controller 700 via terminal devices 720 over networks 730.

Computers may employ central processing unit (CPU) or processor (hereinafter "processor") to process information.

Processors may include programmable general-purpose or special-purpose microprocessors, programmable controllers, application-specific integrated circuits (ASICs), programmable logic devices (PLDs), embedded components, combination of such devices and the like. Processors execute program components in response to user and/or system-generated requests. One or more of these components may be implemented in software, hardware or both hardware and software. Processors pass instructions (e.g., operational and data instructions) to enable various operations.

The channel-based trading controller 700 may include clock 765, CPU 770, memory such as read only memory (ROM) 785 and random access memory (RAM) 780 and co-processor 775, among others. These controller components may be connected to a system bus 760 and through the system bus 760 to an interface bus 735. Further, user input devices 705, peripheral devices 710, co-processor devices 715, and the like, may be connected through the interface bus 735 to the system bus 760. The interface bus 735 may be connected to a number of interface adapters such as processor interface 740, input output interfaces (I/O) 745, network interfaces 750, storage interfaces 755, and the like.

Processor interface 740 may facilitate communication between co-processor devices 715 and co-processor 775. In one implementation, processor interface 740 may expedite encryption and decryption of requests or data. Input output interfaces (I/O) 745 facilitate communication between user input devices 705, peripheral devices 710, co-processor devices 715, and/or the like and components of the controller 700 using protocols such as those for handling audio, data, video interface, wireless transceivers, or the like (e.g., Bluetooth, IEEE 1394a-b, serial, universal serial bus (USB), Digital Visual Interface (DVI), 702.11a/b/g/n/x, cellular, etc.). Network interfaces 750 may be in communication with the network 730. Through the network 730, the controller 700 may be accessible to remote terminal devices 720 (e.g., client devices 180). Network interfaces 750 may use various wired and wireless connection protocols such as, direct connect, Ethernet, wireless connection such as IEEE 702.11a-x, and the like.

Examples of network 730 include the Internet, Local Area Network (LAN), Metropolitan Area Network (MAN), a Wide Area Network (WAN), wireless network (e.g., using Wireless Application Protocol WAP), a secured custom connection, and the like. The network interfaces 750 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including, for example, the access and operation rights of an object by an individual, a machine, and/or an application, and the circumstances under which the permission rights stand. Other network security functions performed or included in the functions of the firewall, can be, for example, but are not limited to, intrusion-prevention, intrusion detection, next-generation firewall, personal firewall, etc., without deviating from the novel art of this disclosure.

Storage interfaces 755 may be in communication with a number of storage devices such as, storage devices 790, removable disc devices, and the like. The storage interfaces 755 may use various connection protocols such as Serial Advanced Technology Attachment (SATA), IEEE 1394, Ethernet, Universal Serial Bus (USB), and the like.

User input devices 705 and peripheral devices 710 may be connected to I/O interface 745 and potentially other interfaces, buses and/or components. User input devices 705 may include card readers, finger print readers, joysticks, keyboards, microphones, mouse, remote controls, retina readers, touch screens, sensors, and/or the like. Peripheral devices 710 may include antenna, audio devices (e.g., microphone, speakers, etc.), cameras, external processors, communication devices, radio frequency identifiers (RFIDs), scanners, printers, storage devices, transceivers, and/or the like. Co-processor devices 715 may be connected to the controller 700 through interface bus 735, and may include microcontrollers, processors, interfaces or other devices.

Computer executable instructions and data may be stored in memory (e.g., registers, cache memory, random access memory, flash, etc.) which is accessible by processors. These stored instruction codes (e.g., programs) may engage the processor components, motherboard and/or other system components to perform desired operations. The controller 700 may employ various forms of memory including on-chip CPU memory (e.g., registers), RAM 780, ROM 785, and storage devices 790. Storage devices 790 may employ any number of tangible, non-transitory storage devices or systems such as fixed or removable magnetic disk drive, an optical drive, solid state memory devices and other processor-readable storage media. Computer-executable instructions stored in the memory may include one or more program modules such as routines, programs, objects, components, data structures, and so on that perform particular tasks or implement particular abstract data types. For example, the memory may contain operating system (OS) component 795, modules and other components, database tables, and the like. These modules/components may be stored and accessed from the storage devices, including from external storage devices accessible through an interface bus.

The database components can store programs executed by the processor to process the stored data. The database components may be implemented in the form of a database that is relational, scalable and secure. Examples of such database include DB2, MySQL, Oracle, Sybase, and the like. Alternatively, the database may be implemented using various standard data-structures, such as an array, hash, list, struct, structured text file (e.g., XML), table, and/or the like. Such data-structures may be stored in memory and/or in structured files.

The channel-based trading system controller 700 may be implemented in distributed computing environments, where tasks or modules are performed by remote processing devices, which are linked through a communications network, such as a Local Area Network ("LAN"), Wide Area Network ("WAN"), the Internet, and the like. In a distributed computing environment, program modules or subroutines may be located in both local and remote memory storage devices. Distributed computing may be employed to load balance and/or aggregate resources for processing. Alternatively, aspects of the controller 700 may be distributed electronically over the Internet or over other networks (including wireless networks). Those skilled in the relevant art will recognize that portions of the channel-based trading system may reside on a server computer, while corresponding portions reside on a client computer. Data structures and transmission of data particular to aspects of the channel-based trading controller 700 are also encompassed within the scope of the invention.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention is recited as a computer-readable medium claim, other aspects may likewise be embodied as a computer-readable medium claim, or in other forms, such as being embodied in a means-plus-function claim. (Any claims intended to be treated under 35 U.S.C. § 112 (f) will begin with the words "means for", but use of the term "for" in any other context is not intended to invoke treatment under 35 U.S.C. § 112 (f).) Accordingly, the applicant reserves the right to pursue additional claims after filing this application to pursue such additional claim forms, in either this application or in a continuing application.

What is claimed is:

1. At least one computer-readable storage medium, excluding transitory signals and carrying instructions, which, when executed by at least one data processor of a system, cause the system to:
   obtain a data signal from a set of channels for a channel device structured to receive a first data stream from a first computing system and a second data stream from a second computing system,
      wherein the data signal is generated by a particular channel in the set of channels,
      wherein the particular channel in the set of channels is structured to generate the data signal based on a portion of one or more of the first data stream or the second data stream, and
      wherein the data signal relates to transmission of data via a transmission medium;
   receive a set of criteria for the channel device via a graphical user interface (GUI) of the channel device,
      wherein the GUI includes a set of graphical representations associated with the set of criteria for the channel device;
   determine the particular channel in the set of channels of the channel device and a subscription to the particular channel that satisfy the set of criteria;
   using the data signal, reduce a required bandwidth amount for the transmission of the data via the transmission medium by performing operations to simplify a trading algorithm based on one or more of the particular channel or the subscription to the particular channel, comprising causing the particular channel of the channel device to:
      modify the data by generating at least one of a synthetic price and an indicator; and
      present, via the data signal on the GUI, modified data comprising the at least one of the synthetic price and the indicator; and
   process an order in accordance with the simplified trading algorithm based on the modified data published on the particular channel of the channel device.

2. The at least one computer-readable storage medium of claim 1, wherein the trading algorithm is a first trading algorithm, wherein the instructions further cause the system to:
   receive, via the GUI, a request associated with creating a new channel absent from the set of channels; and
   create a second trading algorithm based on the new channel.

3. The at least one computer-readable storage medium of claim 1, wherein the particular channel is selected from multiple channels of multiple channel devices.

4. The at least one computer-readable storage medium of claim 1, wherein obtaining the data signal includes routing the data to a data synthesizer configured to generate the data signal based on the particular channel within the set of channels.

5. The at least one computer-readable storage medium of claim 1, wherein the set of criteria for the channel device is based on a particular contract type of a set of contract types associated with the first data stream and the second data stream.

6. The at least one computer-readable storage medium of claim 1, wherein the instructions further cause the system to:
generate, via the particular channel in the set of channels, a third data stream from a third computing system based on a specific application from a set of applications,
wherein the data signal is based on one or more of: the first data stream, the second data stream, or the third data stream.

7. The at least one computer-readable storage medium of claim 1, wherein the order is a market order, wherein the instructions further cause the system to:
submit the order to an electronic marketplace.

8. A computer-implemented method comprising:
obtaining a data signal from a set of channels for a channel device structured to receive a first data stream from a first computing system and a second data stream from a second computing system,
wherein the data signal is generated by a particular channel in the set of channels,
wherein the particular channel in the set of channels is structured to generate the data signal based on a portion of one or more of the first data stream or the second data stream, and
wherein the data signal relates to transmission of data via a transmission medium;
receiving a set of criteria for the channel device via a graphical user interface (GUI) of the channel device,
wherein the GUI includes a set of graphical representations associated with the set of criteria for the channel device;
determining the particular channel in the set of channels of the channel device and a subscription to the particular channel that satisfy the set of criteria;
using the data signal, reducing a required bandwidth amount for the transmission of the data via the transmission medium by performing operations to simplify a trading algorithm based on one or more of the particular channel or the subscription to the particular channel, comprising causing the particular channel of the channel device to:
modify the data by generating at least one of a synthetic price and an indicator; and
present, via the data signal on the GUI, modified data comprising the at least one of the synthetic price and the indicator; and
processing an order in accordance with the simplified trading algorithm based on the modified data published on the particular channel of the channel device.

9. The computer-implemented method of claim 8, wherein the trading algorithm is a first trading algorithm, further comprising:
receive, via the GUI, a request associated with creating a new channel absent from the set of channels; and
create a second trading algorithm based on the new channel.

10. The computer-implemented method of claim 8, wherein the particular channel is selected from multiple channels of multiple channel devices.

11. The computer-implemented method of claim 8, wherein obtaining the data signal includes routing the data to a data synthesizer configured to generate the data signal based on the particular channel within the set of channels.

12. The computer-implemented method of claim 8, wherein the set of criteria for the channel device is based on a particular contract type of a set of contract types associated with the first data stream and the second data stream.

13. The computer-implemented method of claim 8, further comprising:
generate, via the particular channel in the set of channels, a third data stream from a third computing system based on a specific application from a set of applications,
wherein the data signal is based on one or more of: the first data stream, the second data stream, or the third data stream.

14. The computer-implemented method of claim 8, wherein the order is a market order, further comprising:
submit the order to an electronic marketplace.

15. A system comprising a trading platform configured to:
obtain a data signal from a set of channels for a channel device structured to receive a first data stream from a first computing system and a second data stream from a second computing system,
wherein the data signal is generated by a particular channel in the set of channels,
wherein the particular channel in the set of channels is structured to generate a data signal based on a first portion of the first data stream and a second portion of the second data stream corresponding to the first portion, and
wherein the data signal relates to transmission of data via a transmission medium;
receive a set of criteria for the channel device via a graphical user interface (GUI) of the channel device,
wherein the GUI includes a set of graphical representations associated with the set of criteria for the channel device;
determine the particular channel in the set of channels of the channel device and a subscription to the particular channel that satisfy the set of criteria;
using the data signal, reduce a required bandwidth amount for the transmission of the data via the transmission medium by performing operations to simplify a trading algorithm based on one or more of the particular channel or the subscription to the particular channel, comprising causing the particular channel of the channel device to:
modify the data by generating at least one of a synthetic price and an indicator; and
present, via the data signal on the GUI, modified data comprising the at least one of the synthetic price and the indicator; and
process an order in accordance with the simplified trading algorithm based on the modified data published on the particular channel of the channel device.

16. The system of claim 15, wherein the trading algorithm is a first trading algorithm, wherein the trading platform is further configured to:
receive, via the GUI, a request associated with creating a new channel absent from the set of channels; and create a second trading algorithm based on the new channel.

17. The system of claim 15, wherein the particular channel is selected from multiple channels of multiple channel devices.

18. The system of claim 15, wherein obtaining the data signal includes routing the data to a data synthesizer configured to generate the data signal based on the particular channel within the set of channels.

19. The system of claim 15, wherein the set of criteria for the channel device is based on a particular contract type of a set of contract types associated with the first data stream and the second data stream.

20. The system of claim 15, wherein the trading platform is further configured to:
  generate, via the particular channel in the set of channels, a third data stream from a third computing system based on a specific application from a set of applications,
   wherein the data signal is based on one or more of: the first data stream, the second data stream, or the third data stream.

* * * * *